(12) United States Patent
Hudson et al.

(10) Patent No.: US 11,894,801 B2
(45) Date of Patent: *Feb. 6, 2024

(54) MOMENT OPTIMIZED TRUSS FOUNDATIONS FOR SINGLE-AXIS TRACKERS

(71) Applicant: Ojjo, Inc., San Rafael, CA (US)

(72) Inventors: Tyrus Hudson, Petaluma, CA (US); David Mar, Berkeley, CA (US); Katie Pesce, El Cerrito, CA (US)

(73) Assignee: Ojjo, Inc., San Rafael, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 17/122,795

(22) Filed: Dec. 15, 2020

(65) Prior Publication Data
US 2021/0175840 A1   Jun. 10, 2021

Related U.S. Application Data

(63) Continuation of application No. 16/824,550, filed on Mar. 19, 2020, now Pat. No. 10,903,784.
(Continued)

(51) Int. Cl.
*H02S 20/32* (2014.01)
*H02S 20/10* (2014.01)
(Continued)

(52) U.S. Cl.
CPC ............. *H02S 20/32* (2014.12); *F24S 25/13* (2018.05); *F24S 25/617* (2018.05);
(Continued)

(58) Field of Classification Search
CPC .......... H02S 20/10; H02S 20/30; H02S 20/32; F24S 25/13; F24S 25/617;
(Continued)

(56) References Cited

U.S. PATENT DOCUMENTS 812,344 A * 2/1906 Howser .................... B25H 1/06
182/183.1
5,228,924 A * 7/1993 Barker .................... H02S 20/30
136/246
(Continued)

FOREIGN PATENT DOCUMENTS

DE  102005008064 A1 * 8/2006 ............... F24J 2/541
DE  202010014899 U1 ‡ 8/2011 ............. H02S 20/30
(Continued)

OTHER PUBLICATIONS

"Moment Connection", SkyCiv, 2019; https://skyciv.com/docs/tutorials/connection-design-tutorials/moment-connection/ (Year: 2019).‡

*Primary Examiner* — Ryan D Kwiecinski
(74) *Attorney, Agent, or Firm* — Phillip D. Mancini

(57) ABSTRACT

A truss foundation for single-axis trackers that is optimized to resist moments. For foundations that experience lateral loads as well as moments, the foundation supports the rotational axis via a moment connection that is deliberately offset below the work point to reduce the impact of the bending moment. Spacing between the truss legs and the angle of the legs impact the height of the truss work point and, by extension, the available offset below the work point down to the minimum height of the axis of rotation specified by the tracker maker.

19 Claims, 14 Drawing Sheets

Related U.S. Application Data

(60) Provisional application No. 62/821,614, filed on Mar. 21, 2019.

(51) Int. Cl.
| | | |
|---|---|---|
| *F24S 25/13* | (2018.01) | |
| *F24S 25/61* | (2018.01) | |
| *F24S 30/42* | (2018.01) | |
| *F24S 25/617* | (2018.01) | |
| *F24S 30/425* | (2018.01) | |

(52) U.S. Cl.
CPC ............ *F24S 30/425* (2018.05); *H02S 20/10* (2014.12); *Y02E 10/47* (2013.01)

(58) Field of Classification Search
CPC ............ F24S 2025/6003; F24S 30/425; F24S 2030/11; F24S 2030/15; F24S 2030/16; Y02E 10/47
See application file for complete search history.

(56) References Cited

U.S. PATENT DOCUMENTS

| | | | | |
|---|---|---|---|---|
| 6,722,357 | B2* | 4/2004 | Shingleton | H02S 20/23 126/600 |
| 7,472,666 | B1* | 1/2009 | Richard | B63B 17/02 114/361 |
| D586,737 | S* | 2/2009 | Shugar | D13/102 |
| 8,389,918 | B2* | 3/2013 | Oosting | F24S 30/455 250/214 R |
| 8,413,391 | B2* | 4/2013 | Seery | F24S 25/70 52/173.3 |
| 8,511,021 | B2* | 8/2013 | Salisbury | E21B 15/003 52/150 |
| 8,578,929 | B2* | 11/2013 | Krabbe | F24S 25/50 136/246 |
| 8,609,977 | B2* | 12/2013 | Jones | F24S 30/425 250/203.1 |
| 9,057,546 | B2* | 6/2015 | Sade | F24S 30/428 |
| 9,207,000 | B2* | 12/2015 | Kruse | F24S 30/425 |
| 9,466,749 | B1* | 10/2016 | Au | F24S 25/10 |
| D777,098 | S* | 1/2017 | Au | D13/102 |
| 9,551,508 | B2* | 1/2017 | Straeter | F24S 25/70 |
| D844,078 | S* | 3/2019 | Salomone | D21/691 |
| 10,222,446 | B2* | 3/2019 | Au | F16H 19/08 |
| 10,615,739 | B2* | 4/2020 | West | E02D 5/801 |
| 10,670,303 | B2* | 6/2020 | West | F24S 30/425 |
| 10,697,490 | B2* | 6/2020 | Hudson | E02D 7/22 |
| 10,903,784 | B2* | 1/2021 | Hudson | H02S 20/10 |
| 2006/0090789 | A1* | 5/2006 | Thompson | F24S 30/425 136/246 |
| 2008/0029148 | A1* | 2/2008 | Thompson | F24S 25/16 136/244 |
| 2008/0230047 | A1* | 9/2008 | Shugar | F24S 25/617 126/569 |
| 2009/0084429 | A1‡ | 4/2009 | Sureda Alsina | H02S 20/10 136/24 |
| 2009/0184073 | A1* | 7/2009 | Lu | A47G 25/0664 211/198 |
| 2009/0260316 | A1* | 10/2009 | Jones | F24S 30/425 52/745.2 |
| 2012/0006317 | A1* | 1/2012 | Sade | H02S 20/32 126/569 |
| 2013/0048582 | A1* | 2/2013 | Kruse | F24S 30/425 29/897.31 |
| 2013/0340807 | A1* | 12/2013 | Gerwing | H01L 31/02 136/246 |
| 2015/0000721 | A1* | 1/2015 | Au | H02S 20/32 136/246 |
| 2015/0000722 | A1* | 1/2015 | Au | H02S 20/10 136/246 |
| 2015/0001356 | A1* | 1/2015 | Au | H02S 20/00 248/185.1 |
| 2015/0092383 | A1* | 4/2015 | Corio | F24S 30/425 248/214 |
| 2015/0236636 | A1* | 8/2015 | Sade | F16M 11/06 136/246 |
| 2016/0013751 | A1* | 1/2016 | Michotte De Welle | F24S 30/425 136/246 |
| 2016/0118929 | A1* | 4/2016 | Krause | H02S 20/32 136/246 |
| 2016/0329860 | A1* | 11/2016 | Kalus | H02S 20/10 |
| 2017/0234580 | A1* | 8/2017 | Worden | F24S 30/42 126/606 |
| 2018/0006597 | A1‡ | 1/2018 | Patnude | F24S 30/425 |
| 2018/0051915 | A1* | 2/2018 | Rainer | F24S 25/10 |
| 2018/0073773 | A1* | 3/2018 | Grushkowitz | F16D 9/00 |
| 2019/0036478 | A1* | 1/2019 | Liu | H02J 7/35 |
| 2019/0212410 | A1* | 7/2019 | Au | H02S 20/32 |
| 2019/0341878 | A1* | 11/2019 | Watson | F24S 30/425 |
| 2019/0372514 | A1* | 12/2019 | Almy | F24S 25/617 |
| 2020/0072505 | A1* | 3/2020 | Hudson | F24S 50/20 |
| 2020/0076354 | A1* | 3/2020 | West | H02S 20/32 |
| 2020/0076355 | A1* | 3/2020 | Hudson | F24S 25/70 |

FOREIGN PATENT DOCUMENTS

| | | | | |
|---|---|---|---|---|
| DE | 202010014899 U1 * | 10/2011 | | E04H 12/2223 |
| DE | 202011103199 U1 ‡ | 12/2011 | | F24S 25/617 |
| DE | 202011103199 U1 * | 2/2012 | | F24S 25/16 |
| EP | 1989494 B1 ‡ | 2/2013 | | |
| EP | 3410033 A1 * | 12/2018 | | F16B 7/0486 |
| JP | 2017-139942 A ‡ | 8/2017 | | |
| WO | WO-2016142227 A1 * | 9/2016 | | F24S 25/10 |

\* cited by examiner
‡ imported from a related application

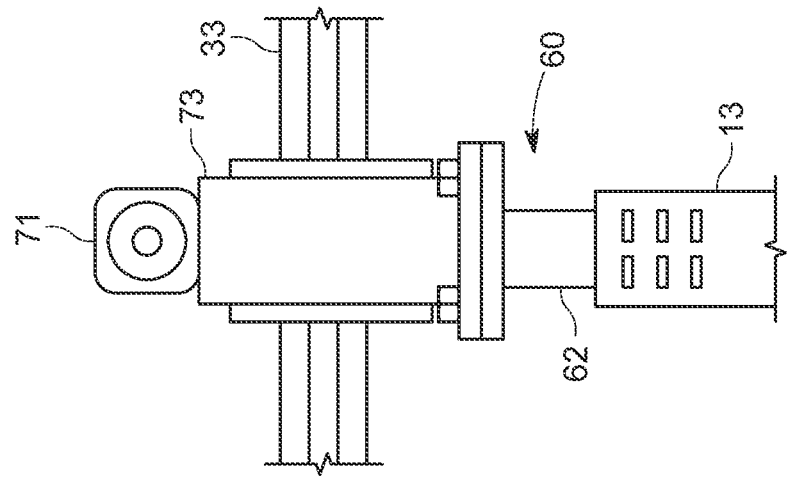
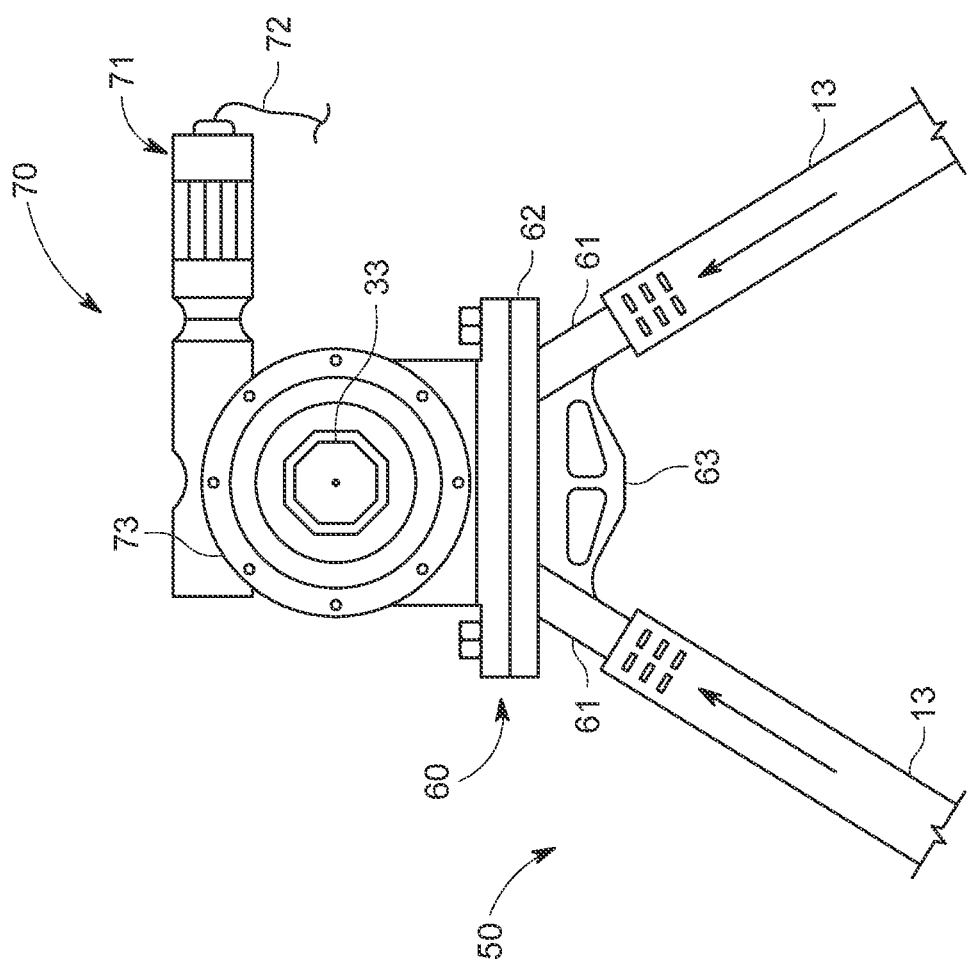
FIG. 2B
FIG. 2A

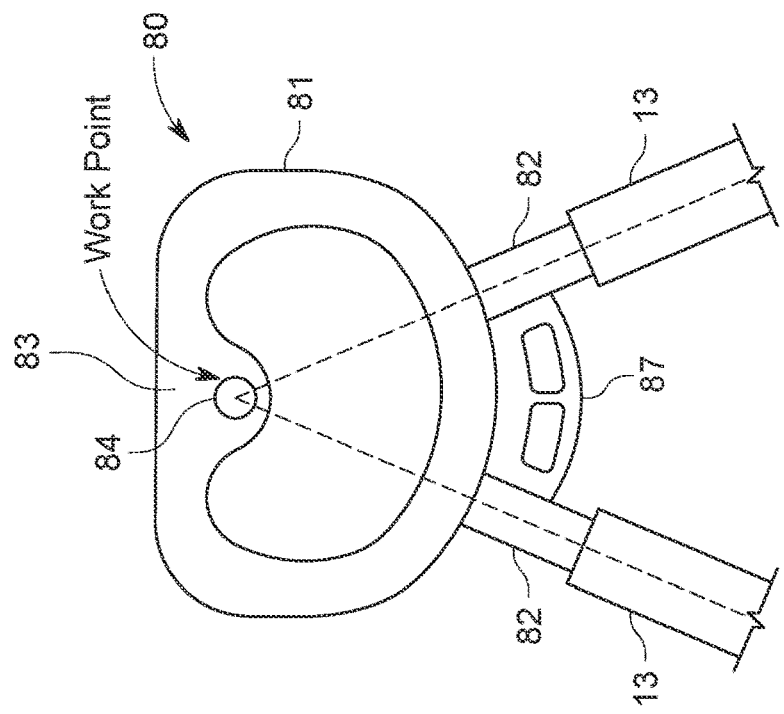
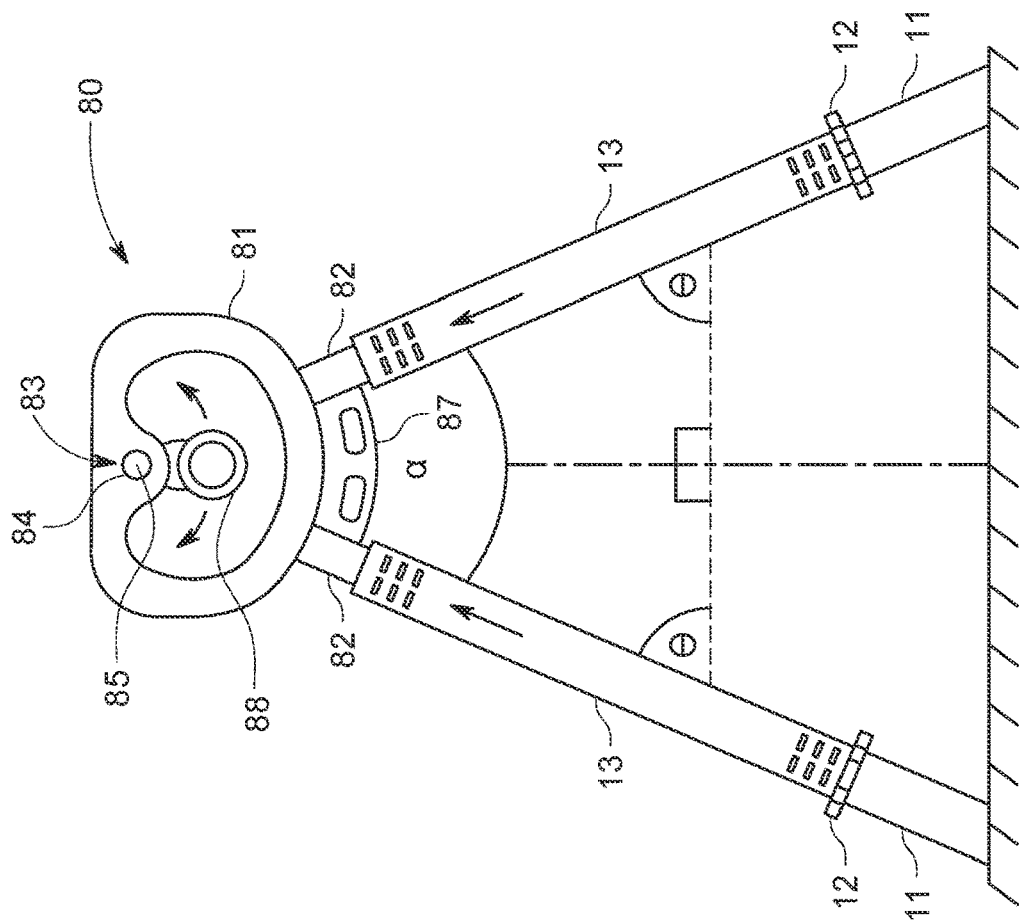
FIG. 3A
FIG. 3B

MOMENT OPTIMIZED TRUSS FOUNDATIONS FOR SINGLE-AXIS TRACKERS

CROSS-REFERENCE TO RELATED APPLICATIONS

This is a Continuation of U.S. utility patent application Ser. No. 16/824,550, filed on Mar. 19, 2020, titled, "Moment optimized truss foundations for single-axis trackers," which claims priority to U.S. provisional patent application No. 62/821,614 filed on Mar. 21, 2019, titled, "A-frame foundations for tracker motor piles and related systems and methods," the disclosures of which are hereby incorporated by reference in their entirety.

BACKGROUND

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall project costs for utility-scale arrays may include site preparation (road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the piles used to support the tracker have an H-shaped profile, but they may also be C-shaped or even box-shaped. In conventional, large-scale single-axis tracker arrays, the procurement and construction of the foundations may represent 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored in to calculations that supported the construction of the project.

One reason monopiles have dominated the market for single-axis tracker foundations is simplicity. It is relatively easy to drive monopiles into the ground along a straight line with existing technology, however, the design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into a monopile foundation as a bending moment. The magnitude of this force is much greater than the static loading attributable to the weight of the panels and tracker components. It acts like a lever arm trying to bend the pile, and the longer the lever arm, the greater the magnitude of the force. Therefore, in the context of single-axis trackers, monopile foundations must be oversized and driven deeply into the ground to withstand lateral loads.

The applicant of this disclosure has invented a foundation system for single-axis trackers to replace monopile supports. Known commercial as EARTH TRUSS, the system uses moderately sloped A-frame-shaped trusses in place of H-piles. Each A-frame-shaped truss is made of a pair of adjacent tubular screw anchors driven into the ground at angles to one another on either side of a North-South oriented tracker row. An upper leg is coupled to the end of each screw anchor and an adapter, bearing adapter or truss cap joins the free ends of each upper legs to complete the truss. One advantage of the A-frame geometry over conventional monopiles is that for foundations that support non-moment connections, the A-frame takes the foundation out of bending and instead subjects it to axial forces of tension and compression. Single structural members are very good at resisting such forces relative to their ability to resist bending, therefore much smaller, tubular members may be used to make up the truss leg. Also, because axial forces dominate, the legs can be driven to shallower embedment depths. The net result is that by using a truss foundation the tracker can be supported with less steel.

In each row of a single-axis tracker, there is typically at least one foundation that supports the drive motor, or in case of linked systems, a row-to-row gear assembly coupled to the torque tube. These foundations present a unique challenge relative to the other foundations that support the tracker with a non-moment connection because they must resist bending moments due to external forces trying to rotate the tracker as well as resisting lateral loads. This is because the motor or drive assembly typically serves as the brake that prevents rotation of the torque tube from external forces such as wind, snow loading, animal loading, and seismic events. To compensate for this, in the prior art, H-pile motor foundations are sized larger and/or driven deeper than the other piles to resist this additional moment. This brute force approach is undesirable for A-frame-shaped truss foundations. The tubular geometry of the truss foundation is not as good as an I-beam at resisting bending so very large truss members would have to be used relative to H-piles to achieve the same level of resistance. Even though motors make up only a small part of the overall system (e.g., <10%), this would erode the advantage of less steel provided by truss foundations.

In recognition of this problem, it is an object of various embodiments of this disclosure to provide a moment-optimized truss foundation for single-axis trackers. It is another object of various embodiments of the invention to provide truss foundations for single-axis trackers that are optimized at each foundation depending on whether the connection to the tracker is a moment connection or non-moment connection.

BRIEF DESCRIPTION OF THE DRAWINGS

FIGS. 2A and 2B show front and side views respectively of a truss foundation supporting a drive motor for the single-axis tracker of FIGS. 1A and B so that the motor's rotational axis is aligned with the truss's work point;

FIGS. 3A and 3B show a truss foundation supporting a portion of a mechanically balanced single-axis tracker so that the tracker's rotational axis is aligned with the truss's work point;

DETAILED DESCRIPTION

The following description is intended to convey a thorough understanding of the embodiments described by providing a number of specific embodiments and details involving truss foundation used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1B:
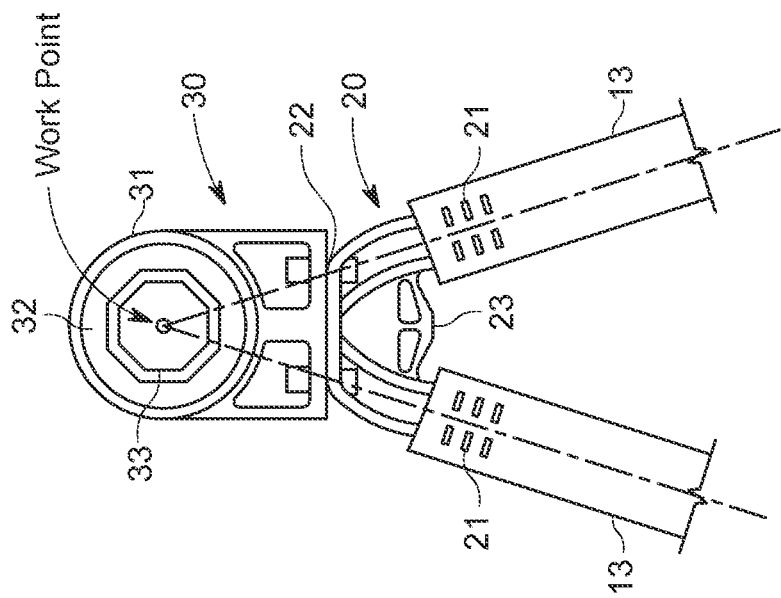
FIGS. 1A and 1B show a truss foundation supporting a portion of a conventional single-axis tracker so that the tracker's rotational axis is aligned with the truss's work point.
Figure 1A:
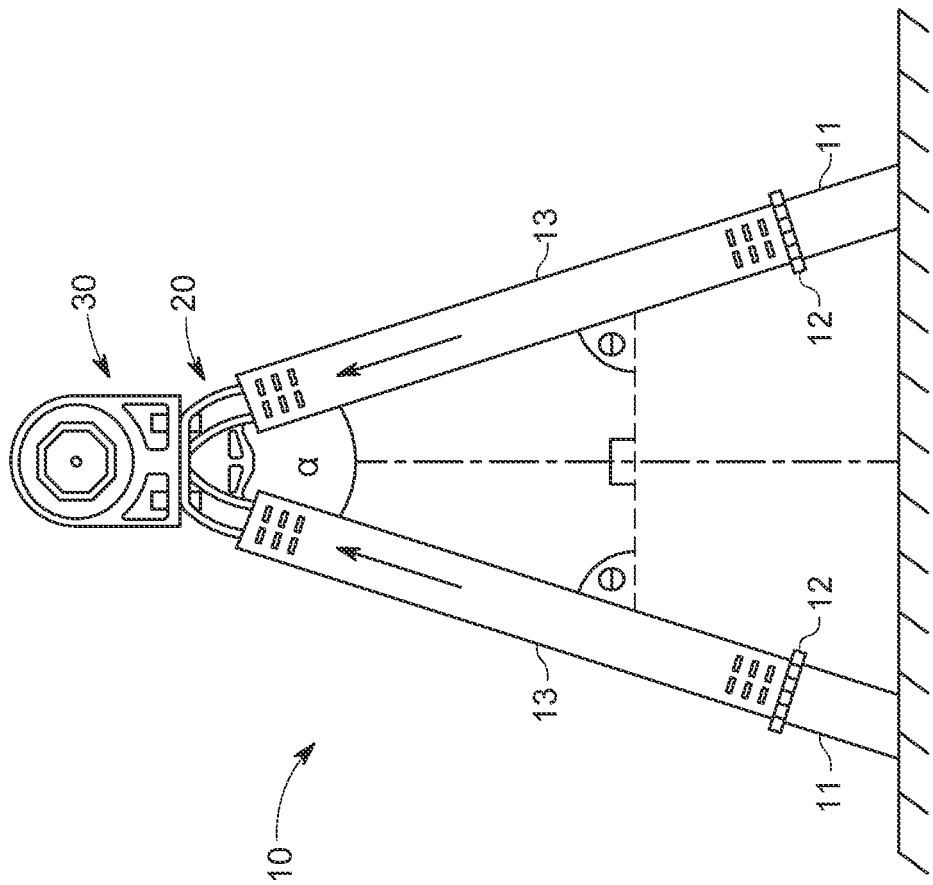

Turning now to the drawing figures, where like elements are referred to with like numbers, FIG. 1A shows truss foundation 10 supporting a portion of an exemplary single-axis tracker. FIG. 1B shows the top end of the foundation and bearing components in greater detail. The tracker shown here is a conventional bottom-up tracker where the torque tube is supported in a series of bearing that enable it to rotate about its own axis such as the DuraTrack HZ single-axis tracker manufactured and sold by Array Technologies, Inc. of Albuquerque, NM. As discussed in the context of FIGS. 3A/3B, truss foundation 10 may also support a top-down style of tracker where the torque tube is suspended from a bearing pin and instead swings through an arc about the pin as shown and discussed in the context of FIGS. 3A/B.

In this example, truss foundation 10 consists of a pair of adjacent angled truss legs joined by adapter 20. The truss legs are moderately angled with respect to the ground by an angle θ that may range from 55-degrees up to 72.5-degrees corresponding to a separation angle between the legs α in range of 70-degrees down to 35-degrees. Each truss leg consists of screw anchor portion 11 extending below ground, driving coupler 12 at the upper end of each screw anchor and upper leg 13 which attaches to the upper end of one of screw anchors 11 via coupler 12. Though not shown in the figure, screw anchor 11 may have an external thread from at the lower end extending several feet into the support ground.

Adapter 20 is shown as a unitary structure with a pair of connecting portions 21 that extend down into each upper leg 13. The connected portions 21 are secured to the leg with a crimp connection by placing a crimper over the portion of each upper leg 13 covering one of the connecting portions 21. Adapter 20 also has a brace or gusset 23 that provides additional support. Exemplary bearing assembly 30 includes main body portion that sits on and is attached to support surface 22 of adapter 20 a pair of bolts or other suitable mechanical fasteners. As seen more clearly in 1B, torque tube 33 is centered within bearing 31 via bearing insert 32. Bearing insert 32 enables the torque tube to have a faceted geometry and still fit within the circular bearing opening of bearing assembly 30. It also prevents metal-to-metal contact within the bearing. In real-world conditions, a single tracker row may extend over 300-feet and include a foundation such as truss foundation 10 every 20-30 feet.

Turning now to FIGS. 2A and 2B, these figures are front and side views respectively of a truss foundation supporting a single-axis tracker drive motor, such as the tracker shown in FIGS. 1A and B. As discussed herein, typically every row of the single-axis tracker array includes at least one foundation that supports a tracker drive assembly. That assembly may consist of a motor and gear box or a linked assembly that spans multiple rows. In this example, motor 70 is configured as a slewing drive, but those of ordinary skill in the art will appreciate that other motor types may be used with the various embodiments of the invention. For example, a gear linkage, chain or other structure may be used to translate output power from a motor positioned elsewhere on or adjacent to the truss. As shown, motor 70 is powered by power supply line 72 which may come from one or more panels of the array or from an external power source.

In the context of FIGS. 2A and B, truss foundation 50 is again formed from a pair of adjacent truss legs, having upper leg portions 13 that are joined with adapter or truss cap 60. As shown, the truss legs are angled less steeply than foundation 10 in FIGS. 1A/B, but this need not be the case. Truss cap 60 has a mounting surface 62 and pair of opposing connecting portions 61 joined by brace 63. Motor assembly 70 sits on and is attached to mounting surface 62, such as, for example, by the bolts shown in the Figures. Motor assembly 70 includes gear housing 73 that is connected to the output of electric clewing drive 71. As drive 71 turns, a worm gear connected to its output may engage teeth of a gear housing 73 to impart torque to torque tube 33 centered within housing 73. In various embodiments, a control algorithm for the system causes a power controller to power motor 70 to incrementally turn torque tube 33 over the course of each day, moving the attached panels from an East-facing orientation to a West-facing orientation, before returning to the East-facing orientation for the next day.

In this example, the rotational axis of the tracker, the center of torque tube 33, is positioned at the work point of truss 50. This is shown by the arrows through the center of each upper leg portion 13 that points directly at the center of torque tube 33. As discussed herein, by aligning a tracker's rotational axis with the work point of the truss, lateral loads are maximally converted into axial forces of tension and compression in the truss legs. However, as discussed in greater detail in the context of FIG. 5-9, this may not be advantageous for foundations that must also resist moments.

Turning now to FIG. 3A, this figure shows truss foundation 10 supporting a portion of another single-axis tracker. FIG. 3B shows the top end of foundation 10 and bearing adapter 80 in greater detail. In this case, the tracker is a mechanically balanced top-down style tracker such as the NX series of single-axis trackers manufactured and sold by NEXTracker Inc., of Fremont, CA In such a tracker the torque tube hangs from a bearing pin above it rather than rotating with a bearing about its own axis. To accomplish this, the drive motor is offset from the rest of the torque tube to be axially aligned with the bearing pin rather than the torque tube so that as the motor turns, the tube swings through an arc. In such a design, the bearing adapter performs at least two functions—first, it joins the two-free legs to complete the A-frame that enables the lateral and vertical forces imparted to the work point to be resisted in the legs as axial forces of tension and compression; second, it holds the torque tube so that its axis of rotation is aligned with the work point of the A-frame and provides a limit to the extent of the arc the torque tube can swing in both the East and West directions.

Truss foundation 10 is essentially the same as that shown in the context of FIGS. 1A and B. Each truss leg consists of upper leg portion 13 joined to the top end of screw anchor 11 via driving coupler 12. However, instead of using a separate adapter to join the truss legs, the adapter has been replaced with bearing adapter 80. As the name implies, bearing adapter 80 joins the truss legs to form a unitary A-frame-shaped truss but also provides the features of the NEXTracker bearing house assembly (BHA). Bearing adapter 80 has a cardioid-shaped frame 81 with a pair of connecting portions 82 extending below into each upper leg 13 and gusset 87. Cardioid-shaped frame 81 has a cusp portion 83 that includes bearing 84. In the NEXTracker ecosystem, a bearing pin such as bearing pin 85 sits in the bearing. One or more torque tube brackets interconnect torque tube 88 to bearing pin 85. The cardioid-shaped frame 81 has a pair of opposing lobes that provide clearance for the torque tube to swing through its arc as the panels are moved from East-facing to West-facing each day.

3B provides a close up view of bearing adapter 80. As seen in the figure, even though the torque tube 88 rotates about bearing pin 85, the truss legs still point at the work point, in this case the center of bearing 84. In such a system, the bearing does not resist rotation of the tracker and therefore the bearing adapter 80 provides a largely non-moment connection to the tracker. The only exception is that when the tracker is at the maximum tilt angle (typically 55 to 60-degrees), any additional external forces may cause the torque tube to contact and bear against the inside of one of the lobes of cardioid-shaped frame 81. This will impart some moment to truss foundation 10. Otherwise, such external forces are resisted only at the foundation supporting the drive motor.

Figure 4B:
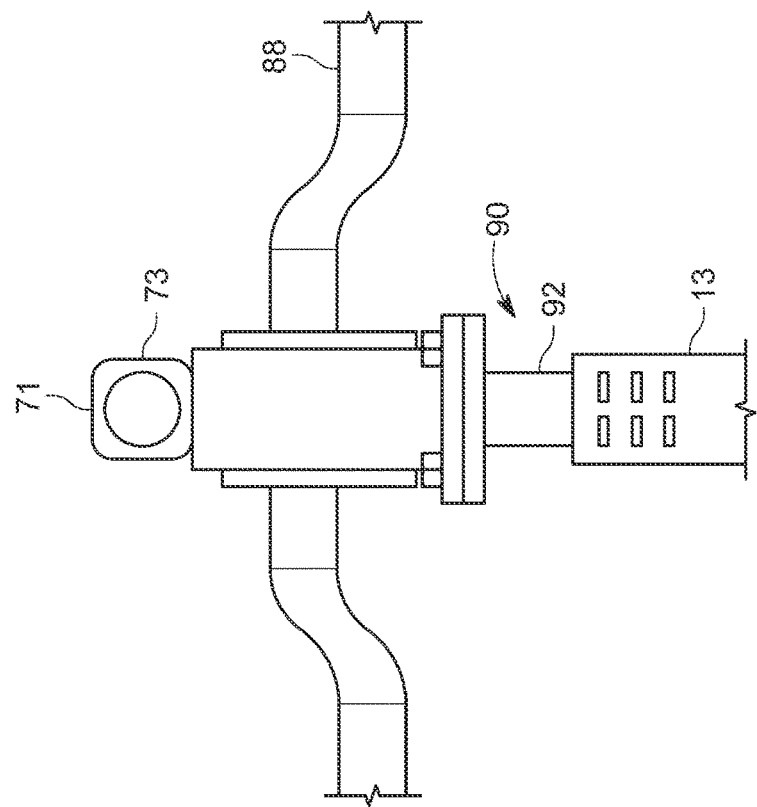
FIGS. 4A and 4B show front and side views respectively of a truss foundation supporting a drive motor for the single-axis tracker of FIGS. 3A and 3B so that the motor's rotational axis is aligned with the truss's work point.
Figure 4A:
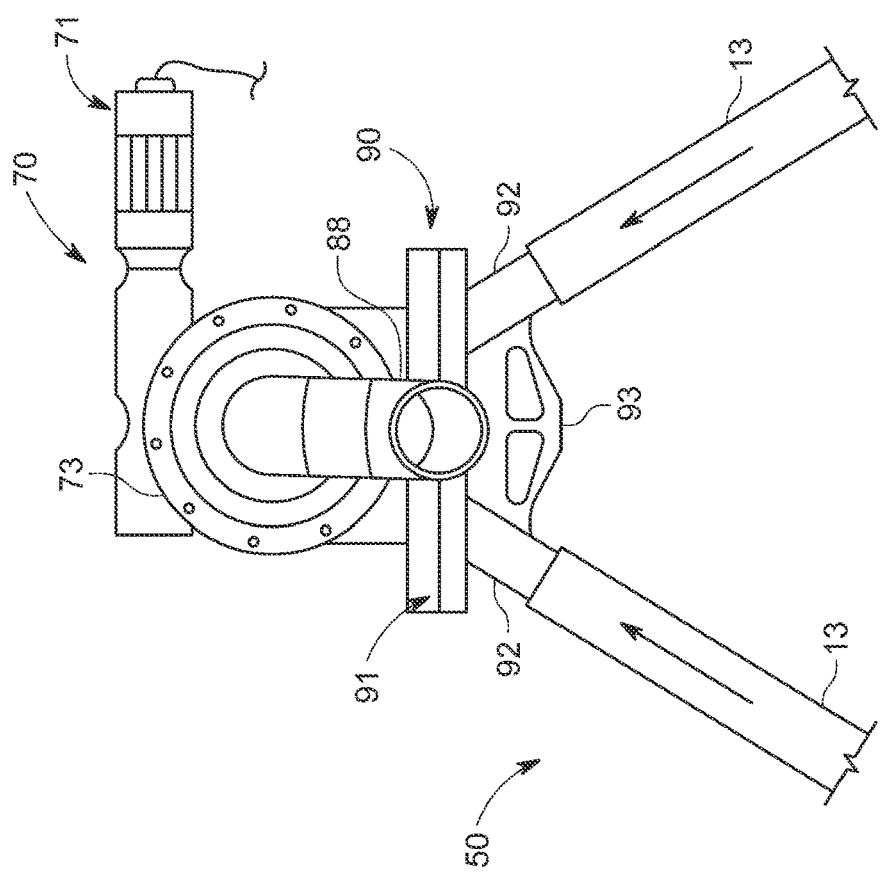
Figure 5A:
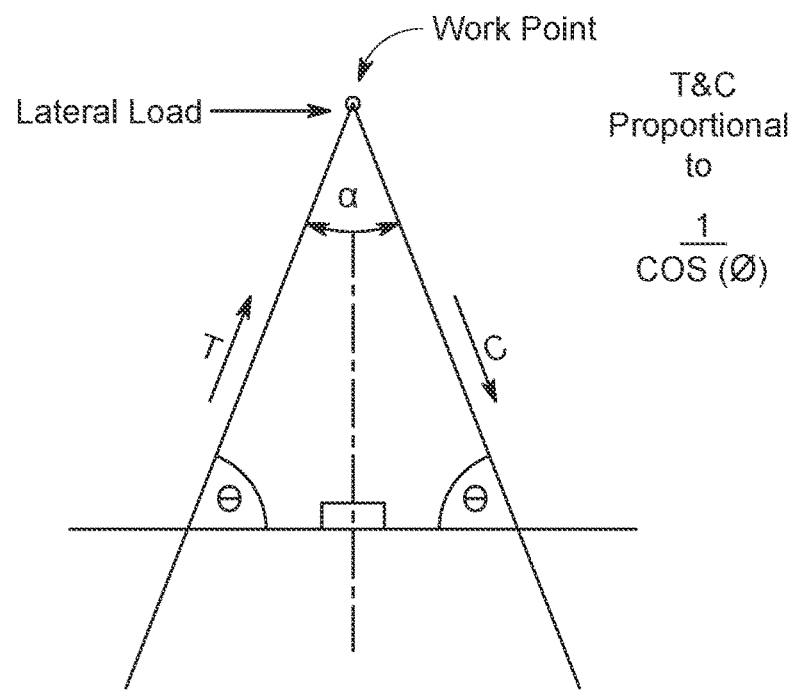
FIGS. 5A and 5B are force diagrams showing the effects of lateral loads and moments on a truss foundation when supporting a single-axis tracker such as that shown in FIG. 1A/B, 2A/B, 3A/B or 4A/B.
Figure 5B:
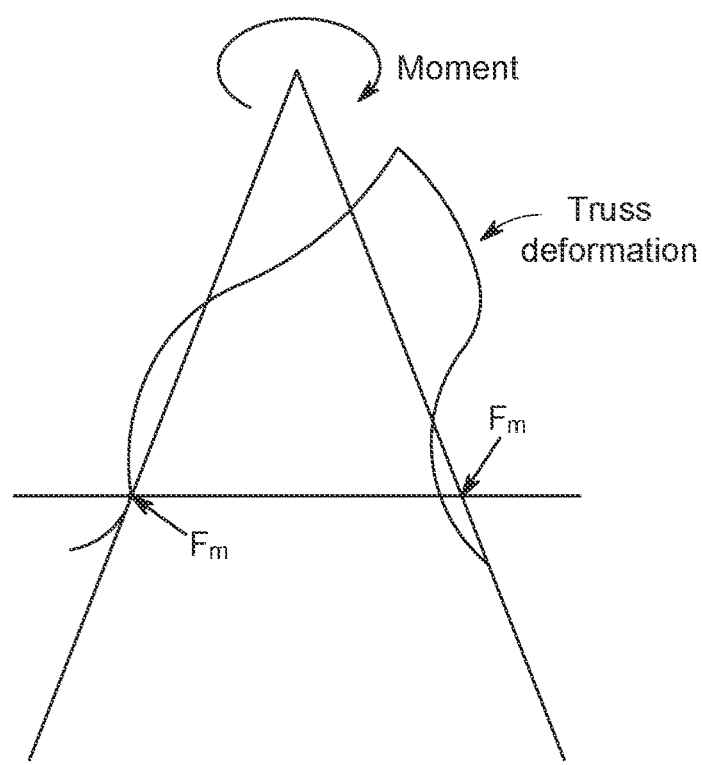

FIGS. 4A and B provide front and side views respectively of the offset drive motor for the top-down single-axis tracker of FIGS. 3A/B. Motor assembly 70 sits on a truss foundation 50 which has legs that are angled at less steeply and spread further apart but it otherwise constructed of the same components. Each leg is made up of a screw anchor (not shown) and upper leg portion 13 which are joined by motor adapter 90 via connecting portions 92. Gusset 93 spans between connecting portions 92 to strengthen adapter 90. The drive motor sits on mounting platform 91 of adapter 90. As shown in particular in 4B, torque tube 88 curves up to gear box 73 on both sides. As the portion of the tube in gear box 73 turns, the portions of the torque tube extending out each direction swing through an arc.

As discussed herein, although the moderately sloped truss foundation is very good at converting lateral loads into axial forces of tension and compression at non-moment connections, it is less efficient at dealing with moment connections that occur at the driver motor and at other bearing connection that resist rotation. The problem is illustrated graphically in FIGS. 5A and B. Starting with 5A, when wind strikes an array supported by a truss foundation such as that in 5A, the force is translated into the foundation as a lateral load. A single-axis tracker array has very little cross-sectional area in the North-South direction. By contrast, the more angled the panels are in either the East or West direction, the cross section becomes quite large. Therefore, wind loads in the East or West directions dominate. If the rotational axis of the tracker at the truss is aligned with the truss work point, the lateral load is translated largely into axial forces of tension and compression in the truss legs, labeled as T and C in the figure. Lateral loads are least when the modules are in the stow position (e.g., 0 degrees tilt) and greatest when the modules are fully tilted (e.g., 55 or 60-degrees) or closest to being vertical. For a given lateral load, the tensile and compressive forces on the truss legs vary as one over the Cosine of the leg angle θ; leg angle values over 60-degrees increase the magnitude of that load and leg angles beyond 72.5-degrees increase to levels that may require additional reinforcement to resist. Therefore, the ideal leg angle range for non-moment connections is between 55 and 72.5 degrees.

Because the torque tube is essentially free to rotate within each bearing housing assembly, there is typically little or no moment on the truss foundations supporting tracker bearings; all the resistance to rotation is provide by the motor. As a result, the motor A-frame must resist not only tension and compression, but also the moment imparted to the A-frame legs from resisting rotation of the torque tube. This moment is "felt" as an orthogonal force F on each leg of the A-frame as shown in 5B. The magnitude of this force F is equivalent to the magnitude of the Moment divided by 2r where "r" is the length of the leg from the moment source (the axis of rotation, ideally the work point) to the point where F is applied. These forces are trying to twist the foundation in a clockwise direction consistent with the direction of the moment shown in FIG. 5. As the force gets larger, the moment will tend to deform and eventually break the truss. Tubular steel is more vulnerable to bending than H-piles, so this problem may be troublesome for truss foundations. Lower leg angles exacerbate this problem relative to steeper ones. In a single-axis tracker where all moments in a row are resisted at the motor, the value of this moment can be quite high. To deal with this, the inventors of this disclosure have discovered that by lowering the height of the rotational axis for trusses that support a moment connection below the virtual work point, that its, the intersection point in space of a line through the approximate center of each truss leg, the impact of this moment on the truss legs is reduced. This is seen, for example in FIG. 6.

Figure 6:
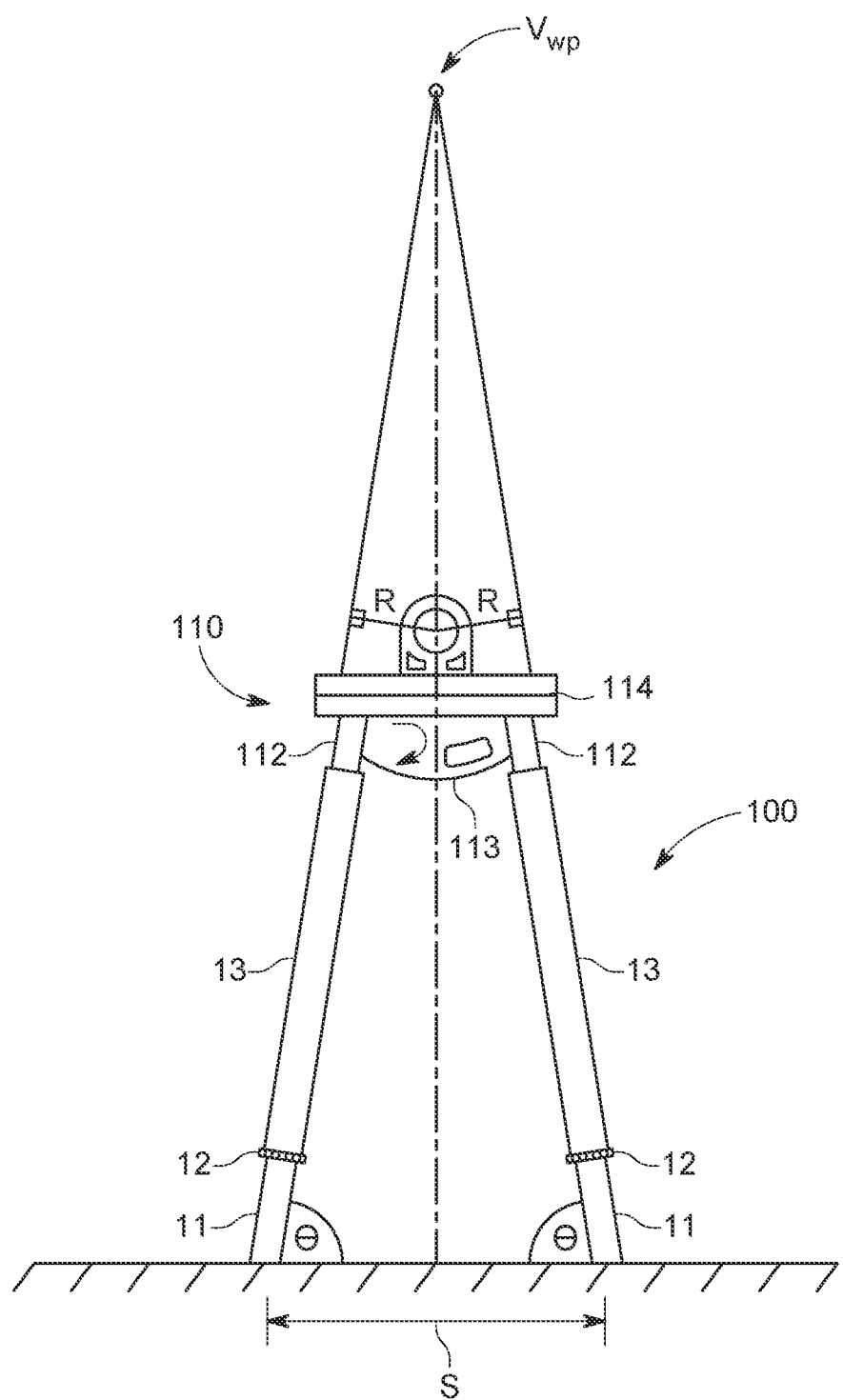
FIG. 6 shows a moment-optimized truss foundation for supporting a drive motor or other tracker component with a moment connection to the foundation.

FIG. 6 shows a truss foundation optimized to resist moments imparted by a single-axis tracker according to various exemplary embodiments of the invention. Truss foundation 100 is formed form a pair of legs angled with respect to the ground by an angle θ that in various embodiments is steeper than the angle of other foundations in the row supporting the tracker with non-moment connections. For example, θ may range from 70 to 85-degrees. The legs are separated at the point where the they enter the ground by a separation distance S. The leg angle θ, separation distance S, and offset distance O from the work point may all be used to reduce the impact of the moment on the foundation. For each leg angle θ and separate distance S, there will be unique virtual work point, that is, the point or region of intersection of a line through each leg. For a given S, the virtual work point will increase in height with leg angle. Adapter 110 has connecting portions 112, gusset 113, and support surface 114 that supports a tracker component, in this case a motor assembly or bearing so that the axis of rotation passing through that component is substantially offset form the virtual work point $V_{WP}$ of the truss foundation.

Figure 7A:
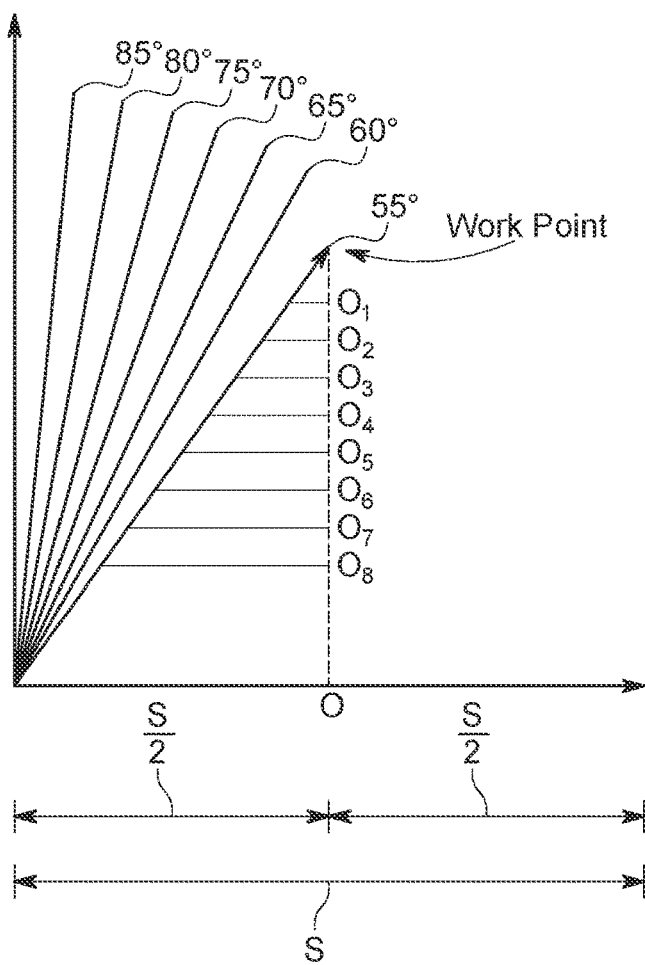
FIGS. 7A and 7B show possible truss leg angles, work point offsets and truss leg separations to offset the tracker's rotational axis from the truss work point at moment connections relative to trusses supporting non-moment connections.
Figure 7B:
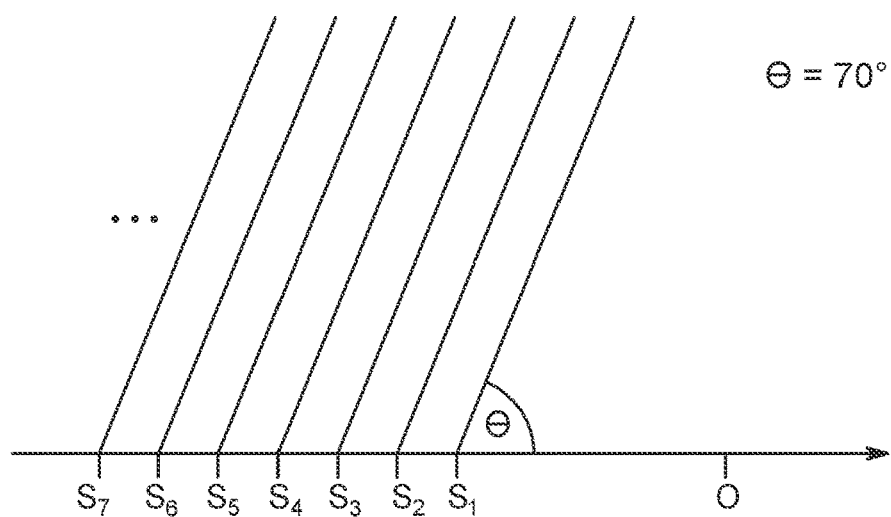

FIGS. 7A and 7B show how leg angle θ, separation distance S, and offset distance O from the work point may be used to optimize the truss to resist moments. 7A shows how for a given separation distance S, the leg angle will result in a different virtual work point $V_{WP}$, increasing in height as the truss leg angle θ becomes steeper. At the same time, at any leg angle θ for a given separation S, any offset O may be chosen between the virtual work point height and the minimum height of the axis of rotation, as specified by the tracker maker, usually greater than or equal to 40 inches. The more moments dominant relative to lateral loads, the larger the ideal offset, subject to material limitations and maximum possible separation distance S. Similarly, as seen in FIG. 7B, as leg separation distance S is increased, for a given leg angle the virtual work point $V_{WP}$ will increase. The maximum S will be limited by the range of the machine driving the screw anchors. Generally speaking, greater offset between the virtual work point and the tracker's axis of rotations will improve the truss's ability to resist moments by lessening the maximum value of the moment experienced in the truss legs with some increase in the impact of lateral loads on tension and compression values.

Figure 8A:
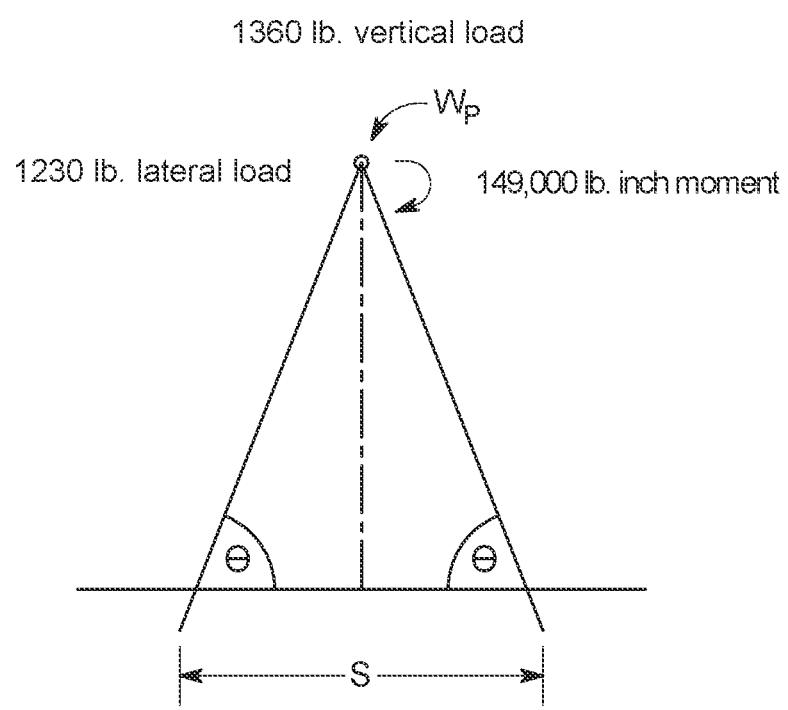
FIG. 8A is a force diagram showing the force profile on a truss foundation that supports a moment connection when the tracker's rotational axis is aligned with the work point.
Figure 8B:
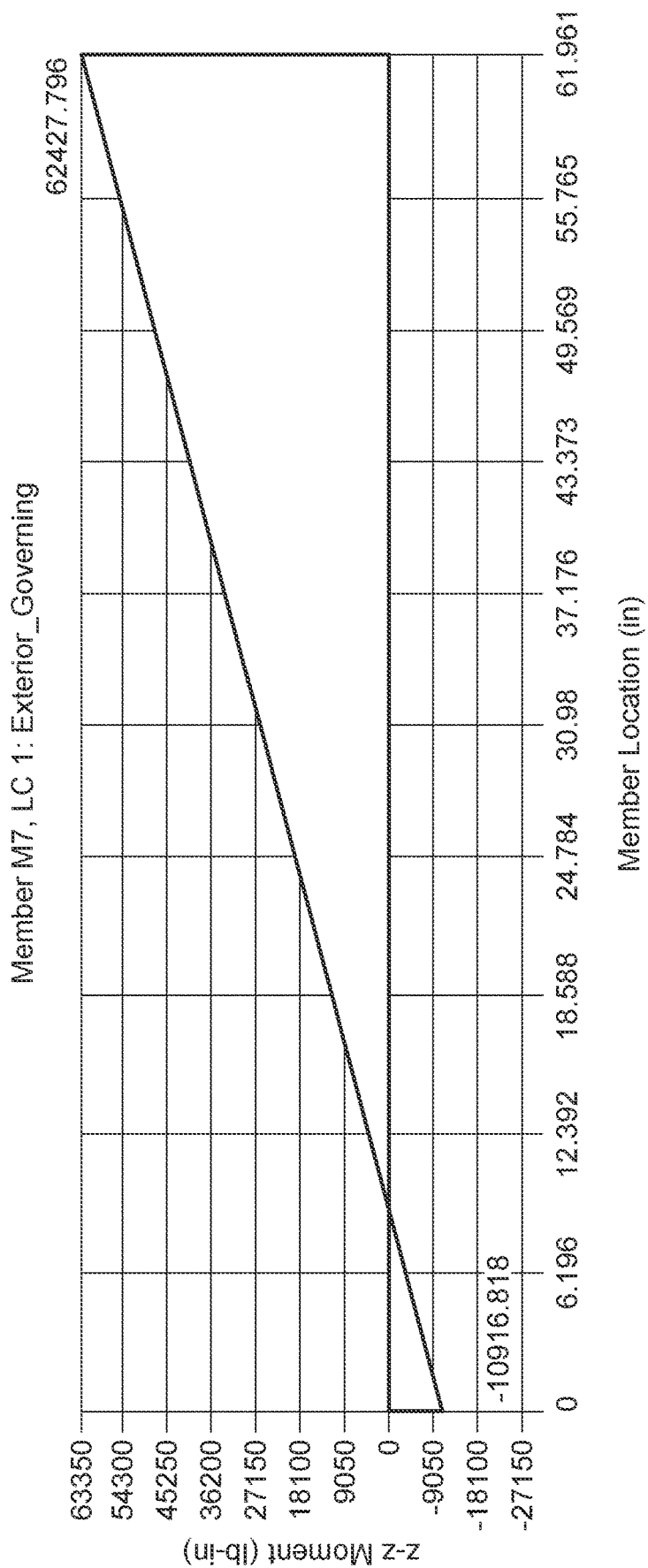
FIG. 8B is a graph showing the maximum moment values for the truss foundation of FIG. 8A.

Turning now to FIG. 8A, this figure shows a standard truss foundation that is subjected to loading conditions of a lateral load $F_L$ of 1230-pounds, a vertical load of 1360-pounds, and a moment of 149 kip or 149,000 lb./inches. These values may be typical for the worst-case top of pile loads for a single-axis tracker drive motor, whether supported by a truss foundation or conventional H-piles. In the truss of 8A, the rotational axis is aligned with the work point, which is at a height of six-feet or 72-inches. The truss leg angle is 70-degrees. FIG. 8B is graph generated in RISA 3-D, a software program developed and sold by RISA Tech, Inc. of Foothill Ranch, CA, that shows the magnitude of the resultant moment along each leg under these conditions. As seen in the graph of 8B, aligning the rotational axis with the work point under these conditions results in a maximum moment force of more than 60,000 pound/inches. This may exceed the moment capacity of the truss components and therefore could result in failure of the truss. Resisting a moment of that magnitude would require substantial upsizing of the truss components relative to trusses supporting the tracker with non-moment connections and may even require using different materials such as I-beams that are better at resisting bending then the tubes used to form trusses.

Figure 9A:
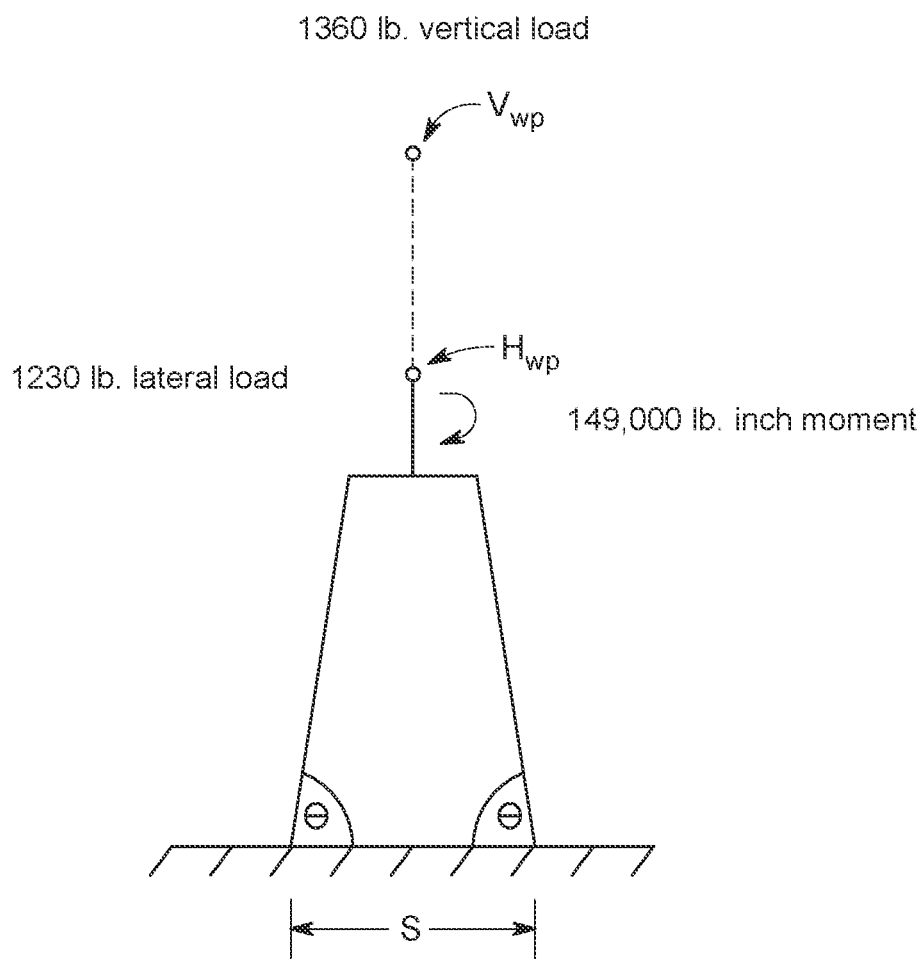
FIG. 9A is a force diagram showing the force profile on a truss foundation that supports a moment connection when the tracker's rotational axis is offset from the work point.
Figure 9B:
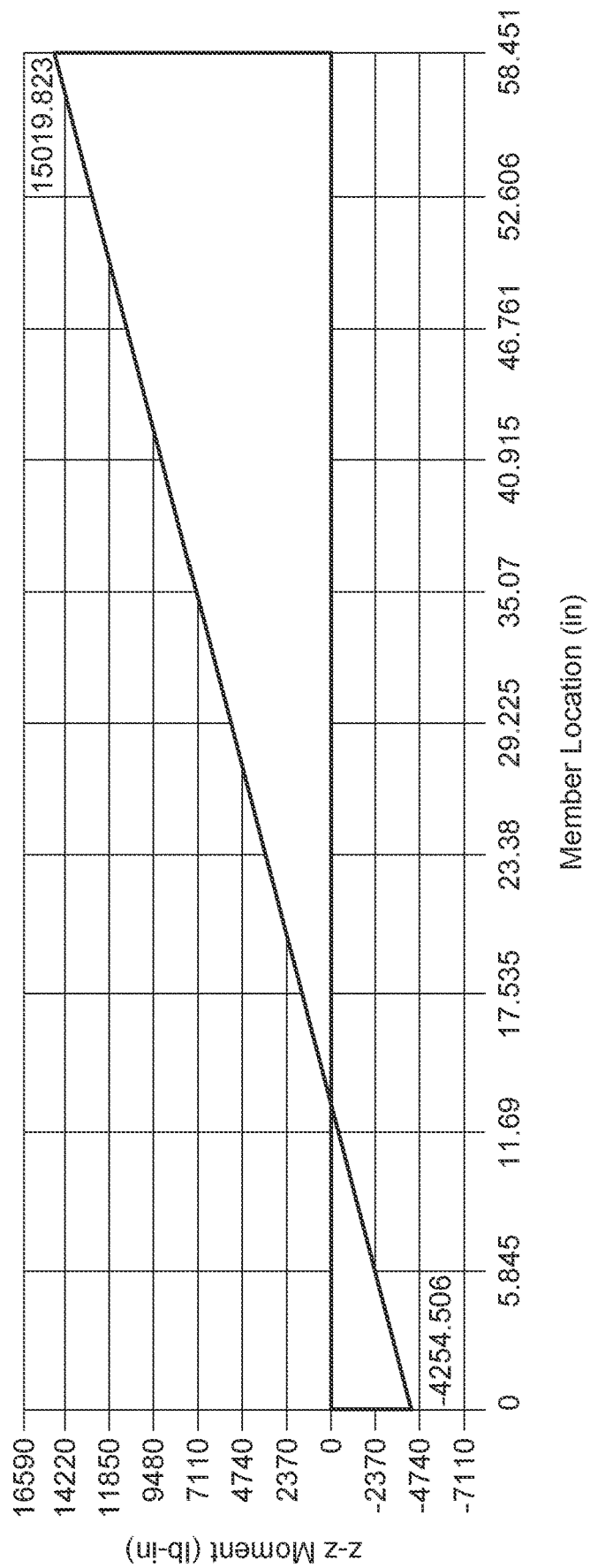
FIG. 9B is a graph showing the maximum moment values for the truss foundation of FIG. 9A.

As discussed herein, the brute force approach of using more steel is antithetical to the elegance of the truss foundation and may erode some of the cost advantage offered by truss foundations. Therefore, the inventors of this disclosure have discovered that by deliberately lowering the rotational axis below the work point for trusses supporting the tracker with a moment connection, the maximum moment on the truss legs is drastically reduced. FIGS. 9A and 9B, 9A show the geometry of an offset truss foundation according to various exemplary embodiments of the invention under the same loading conditions as the truss of 8A; that is a lateral load of 1230-pounds, a vertical load of 1360-pounds and a 149 kip or one hundred-forty nine thousand pound-inch moment. When the leg angles are set to 80-degrees and S is approximately 46.5-inches, if the rotational axis is held at the same height as in 8A—72-inches—but the virtual work point $V_{WP}$ is at 11-feet or 132-inches, the maximum moment value in the legs is cut to 15,000 pound inches, or ¼ of the value of the truss in 8A. Therefore, by increasing the leg angle to raise the virtual work point $V_{WP}$ so that the offset O is 5-feet, the truss foundation in 8A drastically reduces the impact of the moment force on the truss legs by offsetting the height of the rotational axis, labeled $H_{WP}$ in the figure below the virtual work point $V_{WP}$. This is seen graphically in 9B. Therefore, even though the rotational axis is at the same height as that of the other trusses in the row supporting the tracker with non-moment connections, raising $V_{WP}$ has a significant impact on the value of the moment that must be resisted in the truss legs. This technique allows a truss to be constructed with the same members used to support non-moment connections but with a different geometry and to be able to successfully support moment connections.

Figure 10:
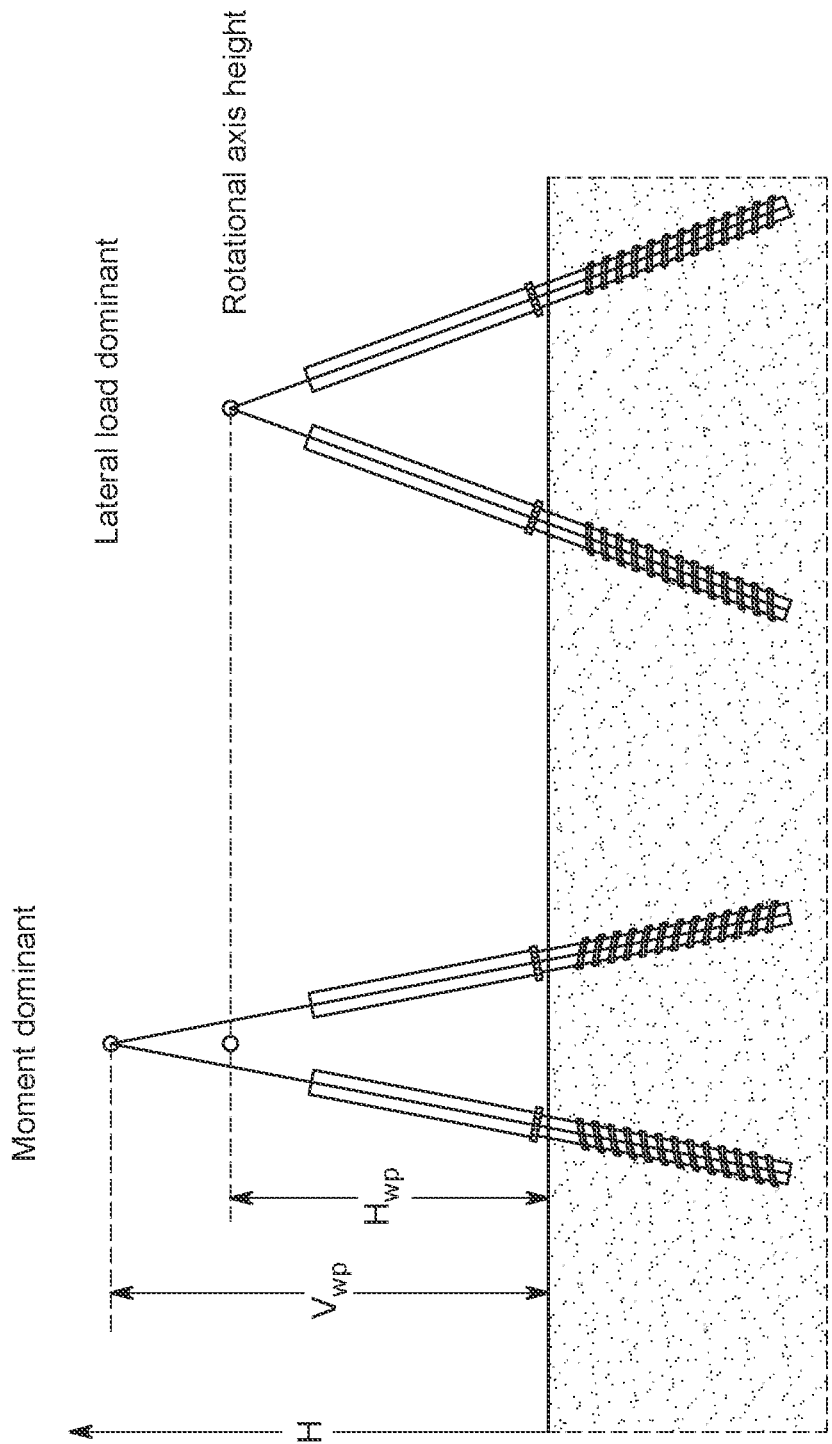
FIG. 10 shows a pair of truss foundation for supporting a single-axis tracker with moment and non-moment connections.

As discussed herein, truss foundations may be used to efficiently support single-axis trackers, however, consideration should be given to the nature of the connection between the tracker and each truss foundation. Referring to FIG. 10, for non-moment connections where lateral loads dominate, optimization is achieved by aligning the tracker's axis of rotation, whether it be the torque tube itself or a bearing pin from which the torque tube is suspended, with the work point of the truss. By contrast, moment-connections that are dominated by large moment values may still be supported by a truss foundation of essentially the same components, but the truss geometry should be changed so that on those foundations, the legs point at a much higher work point and the rotational axis, for example, the center of the torque tube as it passes through the gear box, should be offset from that truss's virtual work point $V_{WP}$ by a non-zero amount, with larger offsets having a greater impact. Although offset from its own work point, the height of the rotational axis at this moment connection truss should be aligned with the work point of the non-moment connection trusses, which in the case of those trusses, will align with the rotational axis. As discussed herein, this problem and its solution are unique to truss foundations because single H-piles must resist moments regardless of whether the connection is a moment or non-moment connection. It should be appreciated that in some single-axis trackers, moment resistance may be distributed across several or even all foundations. In such cases, the principles discussed herein may be applied to the geometry of multiple truss foundation in each row, militating in favor of some offset of the rotational axis below the work point of the truss.

Figure 11:
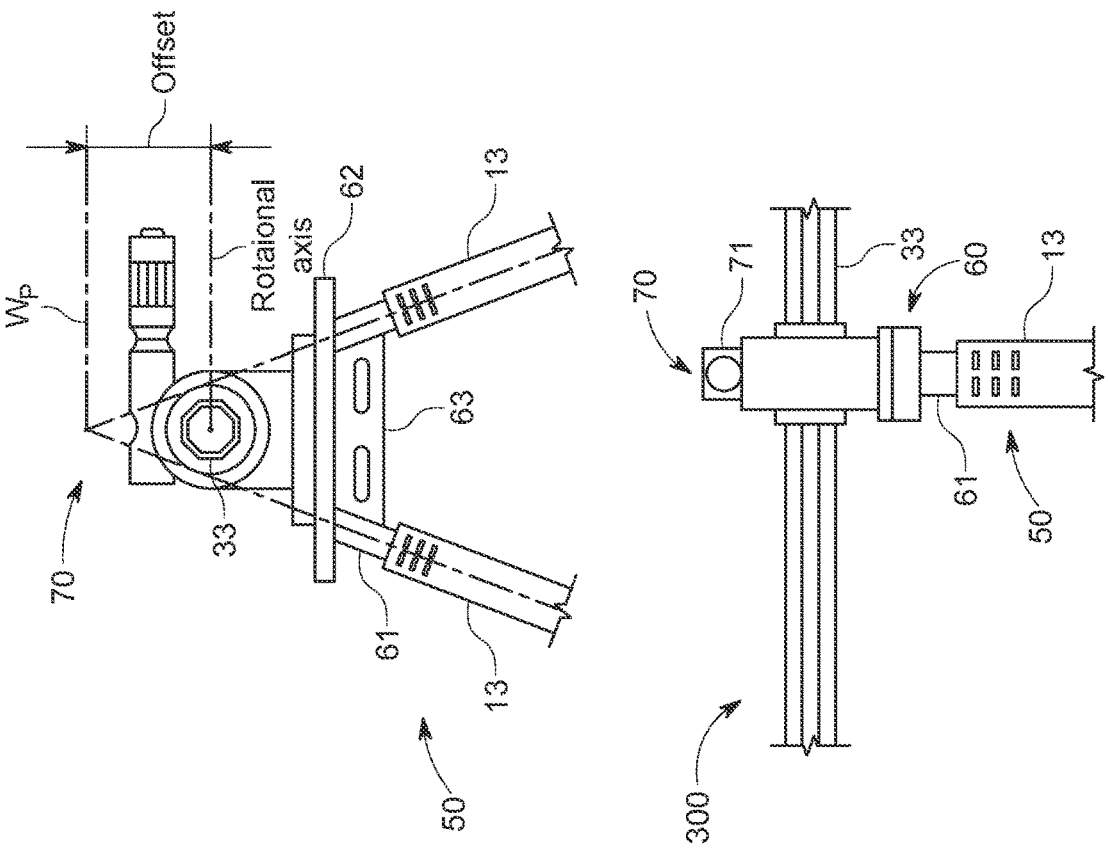
FIG. 11 shows a single-axis tracker with two different truss foundations according to various embodiments.
Figure 11:
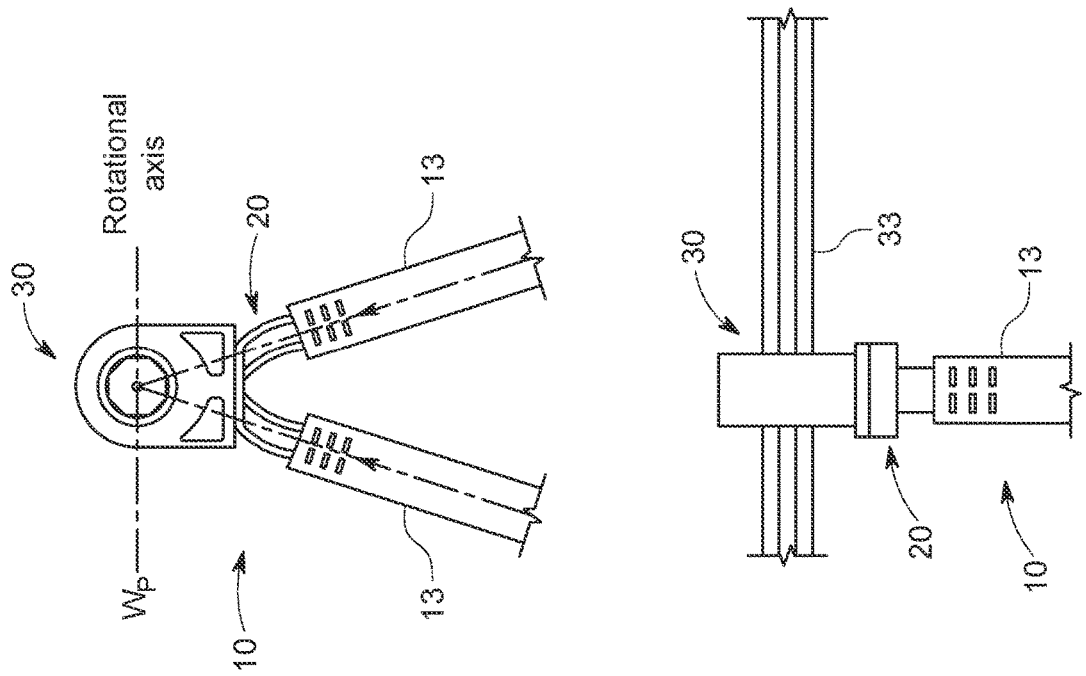
Figure 12:
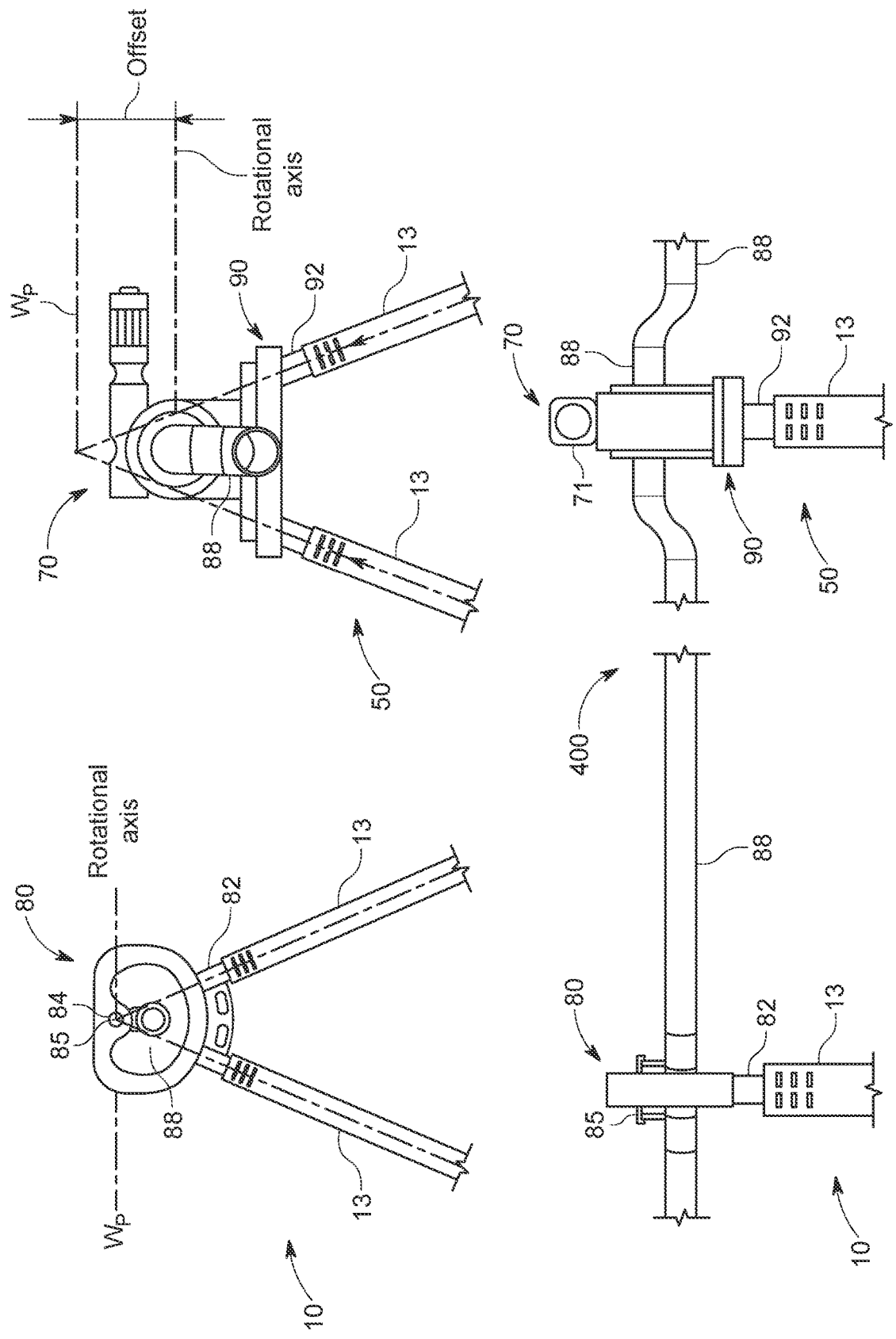
FIG. 12 shows another single-axis tracker with two different truss foundations according to various embodiments.

FIGS. 11 and 12 exemplify the use of different foundations to support different components of a single-axis tracker depending on the type of forces experienced by a particular tracker component. Starting with FIG. 11, this figure shows a portion of single-axis tracker 300 having two different truss foundations. The portion of tracker 300 shown in FIG. 11 includes bearing assembly 30 on truss cap 20 supported by upper legs 13 of first truss foundation 10. At another point along torque tube 33, motor assembly 70 is supported on motor support 62 of truss cap 60 that sits on second truss foundation 50. Truss cap 20 orients bearing assembly 30 so that the rotational axis of the tracker, in this case torque tube 33, is aligned with the work point of truss 10. That is, the rotational axis coincides with a point of intersection an axis through each truss leg of foundation 10. This presupposes that bearing assembly 30 allows the torque tube to rotate freely within the bearing so that lateral wind loads do not subject foundation 10 to a bending moment. If, however, bearing assembly 30 does prevent rotation, it may be necessary to offset the rotational axis below the work point of truss 10. By contrast, motor assembly 70 acts as a rotational brake against unintended rotation of torque tube 33 due to lateral wind loads. This results in a bending moment being applied to foundation 50. To better handle this moment, truss cap 60 and the legs of truss 50 orient motor assembly 70 so that tracker 300's axis of rotation is offset below the work point of the truss. This reduces the magnitude of the moment relative to orienting it at or above the work point enabling smaller components and connections to be used to support the same tracker.

Turning now to FIG. 12, this figure shows a portion of single-axis tracker 400. The portion of single-axis tracker 400 shown here includes bearing adapter 80 suspending torque tube 88 from bearing pin 85 seated in bearing 84 above truss foundation 10. Connecting portions 82 of bearing adapter 80 are received in respective upper legs 13 to complete the truss. As shown, the rotational axis, in this tracker, bearing pin 85, is aligned with the work point of truss foundation 10. Bearing pin 85 is free to rotate within bearing 84, at least until torque tube 88 contacts bearing adapter 80. Therefore, lateral wind loads on array 400 will not impart a bending moment to foundation 10. By contrast, foundation 50, supporting motor assembly 70 along the same torque tube 88, does so by orienting the rotational axis of tracker 400, which at the motor assembly 70 is the torque tube. As shown, torque tube 88 curves up and then back down as it passes through motor assembly 70. This offset drive mechanism rotates the torque tube at the motor but causes it to swing like a pendulum at each bearing adapter 80. The rotational axis at motor assembly 70 is offset below the work point of the truss. As motor assembly 70 resists unintended rotation of tracker 400, the bending moment imparted to foundation 50 will be reduced due to this offset.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present invention as disclosed herein.

The invention claimed is:

1. A single-axis solar tracker comprising:
a plurality of first truss foundations, each comprising a pair of truss legs and a first adapter with a pair of connecting portions that join the truss legs at an angle to form the first truss foundation, each first truss foundation supporting a rotational axis of the single-axis tracker to substantially intersect a work point of each first truss foundation, the work point comprising a point of intersection of line through the center of each truss leg; and
at least one second truss foundation, comprising a pair of truss legs and a second adapter with a pair of connecting portions that join the truss legs at an angle to form the at least one second truss foundation, the at least one second truss foundation supporting the rotational axis of the single axis tracker offset below the work point of the at least one second truss foundation.

2. The single-axis solar tracker according to claim 1, wherein the at least one second truss foundation supports a component of the single-axis tracker that resists unintended movement of the tracker about the rotational axis attributable to external forces by imparting a bending moment to the at least one second truss foundation.

3. The single-axis solar tracker according to claim 2, wherein the at least one second truss foundation supports a drive assembly of the single-axis tracker.

4. The single-axis tracker according to claim 3, wherein the drive assembly rotates the single axis tracker about its rotational axis.

5. The single-axis tracker according to claim 3, wherein the drive assembly comprises a slew motor and gear box.

6. The foundation according to claim 3, wherein the drive assembly comprises an inter-row drive assembly interconnecting two or more adjacent tracker rows.

7. The foundation according to claim 1, wherein the rotational axis is a torque tube of the tracker.

8. The foundation according to claim 1, wherein the rotational axis is a bearing pin rotatably supporting a torque tube.

9. A single-axis tracker supported by force optimized truss foundations comprising:
a rotational axis for simultaneously changing an orientation of a plurality of solar panels with respect to the sun;
a drive assembly operable to rotate the tracker about the rotational axis;
a plurality of first truss foundations, each first truss foundation supporting the rotational axis at a work point of the first truss foundation, the work point comprising a point of intersection of line through the center of each pair of legs of each first truss foundation; and
at least one second truss foundation, the at least one second truss foundation supporting the rotational axis below a work point of the at least one second truss foundation.

10. The single-axis tracker according to claim 9, wherein each first truss foundation supports a rotating member within a bearing.

11. The single-axis tracker according to claim 10, wherein the rotating member is one of a torque tube and a bearing pin.

12. The single-axis tracker according to claim 11, wherein the at least one second truss foundation supports a drive assembly of the single-axis tracker.

13. The single-axis tracker according to claim 12, wherein the drive assembly causes the tracker to move about the rotational axis.

14. The single-axis tracker according to claim 13, wherein the drive assembly comprises a slew motor and gear box.

15. The single-axis tracker according to claim 13, wherein the drive assembly comprises an inter-row drive assembly interconnecting two or more adjacent tracker rows.

16. The single-axis tracker according to claim 9, wherein the at least one second truss foundation supports a tracker component that resists movement of the tracker about the rotational axis attributable to external forces.

17. A method of assembling a force optimized single-axis tracker comprising:
constructing a plurality of first truss foundations along an intended tracker row;
constructing at least one second truss foundation in the intended tracker row;
installing a first tracker component on each first truss foundation, the first tracker component enabling substantially unrestricted rotation of the tracker's rotational axis; and
installing a second tracker component on the at least one second truss foundation, the second tracker component resisting movement of the tracker about the rotational axis attributable to external forces by translating said forces into a bending moment on the at least one second truss foundation, wherein the first tracker component is installed so that the tracker's rotational axis substantially overlaps with a work point of each first truss foundation and the second tracker component is installed so that the tracker's rotational axis is below the work point of the at least one second truss foundation, where the work point comprising a point of intersection of line through the center of each pair of legs of each truss foundation.

18. The method according to claim 17, wherein installing a first tracker component comprises installing a tracker bearing assembly.

19. The method according to claim 17, wherein installing a second tracker component comprises installing a drive assembly.

* * * * *